US010024664B1

(12) United States Patent
Gill et al.

(10) Patent No.: US 10,024,664 B1
(45) Date of Patent: Jul. 17, 2018

(54) RANGE AND INTENSITY IMAGE-BASED TERRAIN AND VEHICLE RELATIVE POSE ESTIMATION SYSTEM

(71) Applicant: The United States of America as represented by the Administrator of the National Aeronautics and Space Administration, Washington, DC (US)

(72) Inventors: Nathaniel Gill, Ellicott City, MD (US); John M. Van Eepoel, Greenbelt, MD (US); Joseph M. Galante, Laurel, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/502,069

(22) Filed: Sep. 30, 2014

(51) Int. Cl.

| | | |
|---|---|---|
| G01C 21/00 | (2006.01) | |
| B60R 1/00 | (2006.01) | |
| G06T 7/20 | (2017.01) | |
| G06T 3/00 | (2006.01) | |
| G06T 3/60 | (2006.01) | |
| G06K 9/52 | (2006.01) | |

(52) U.S. Cl.
CPC .......... *G01C 21/00* (2013.01); *B60R 1/00* (2013.01); *G06K 9/52* (2013.01); *G06T 3/00* (2013.01); *G06T 3/60* (2013.01); *G06T 7/20* (2013.01)

(58) Field of Classification Search
CPC ...... G01C 21/00; G01C 21/3602; B60R 1/00; G06K 9/20; G06K 9/32; G06K 9/3208; G06K 9/2316; G06K 9/3225; G06K 9/3233; G06K 9/3241; G06K 9/36; G06K 9/38; G06K 9/40; G06K 9/4642; G06K 9/4647; G06K 9/52; G06T 3/00; G06T 3/60; G06T 7/20
See application file for complete search history.

(56) References Cited

PUBLICATIONS

Galante et al., "Pose Measurement Performance of the Argon Relative Navigation Sensor Suite in Simulated Flight Conditions," AIAA Guidance, Navigation and Control Conference, Aug. 13-16, 2012, pp. 1-15, Minneapolis, MI.*
Naasz et al., "The HST SM4 Relative Navigation Sensor System," The Journal of the Astronautical Sciences, Jan. 2009, vol. 57, Issue 1, pp. 457-483.*
Drummond et al., "Real-Time Visual Tracking of Complex Structures," IEEE Transaction on Pattern Analysis and Machine Intelligence, vol. 24 No. 7, Jul. 2002.*

* cited by examiner

*Primary Examiner* — Jerrah Edwards
*Assistant Examiner* — Adam Mott

(57) ABSTRACT

A navigation system includes an image acquisition device for acquiring a range image of a target vehicle, at least one processor, a memory including a target vehicle model and computer readable program code, where the processor and the computer readable program code are configured to cause the navigation system to convert the range image to a point cloud having three dimensions, compute a transform from the target vehicle model to the point cloud, and use the transform to estimate the target vehicle's attitude and position for capturing the target vehicle.

14 Claims, 8 Drawing Sheets

RANGE AND INTENSITY IMAGE-BASED TERRAIN AND VEHICLE RELATIVE POSE ESTIMATION SYSTEM

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

BACKGROUND

The disclosed embodiments generally relate to a navigation system and more particularly to a relative navigation measurement system for vehicle and terrain relative navigation and control.

In-space rendezvous is a key enabling technology for many current and planned space missions, especially in the areas of human exploration, multiplatform scientific investigations, and in-space servicing. Having an ability to rendezvous with an orbiting spacecraft in order to provide refuel, repair, and repositioning services, is significant. However, earlier launched space vehicles may be characterized as non-cooperative, that is, they may have no cooperative retro-reflectors, acquisition sensors, or docking or grapple features. Furthermore, some form of robotic manipulator may be required to capture a suitable feature, such as a target vehicle's Marman ring, the location where the target vehicle structure connects with a launch vehicle. In addition, capturing a target space vehicle generally requires a high level of autonomy because of the size, mass, and relative motion of the vehicle.

Optical imaging systems may provide images with adequate resolution for roughly locating a target vehicle but may not provide range detection with the accuracy required to precisely align the target and a capture device such as a robot manipulator. Also, optical image quality may vary significantly depending on the orientation of the sun or other bright bodies relative to the target vehicle. Three dimensional imaging sensors, such as Light Detection and Ranging (LiDAR) systems, may supply their own sources of illumination and may therefore produce range information and imagery independent of natural lighting but may not provide enough resolution to accurately align the target vehicle and capture device.

Various solutions may be used to translate between the coordinate system of the capture device and the target vehicle and to register 3-D shapes of the target vehicle in order to autonomously estimate the target vehicle's relative attitude and position, also referred to as the target vehicle's pose. For example, Horn, "Closed-form Solution of Absolute Orientation Using Unit Quaternions," Optical Society of America, April 1987, pp. 629-642, Vol. 4, No. 4, provides a closed form solution to the least-squares problem for three or more points. As another example, Besl and McKay, "A Method for Registration of 3-D Shapes," IEEE Transactions on Pattern Analysis and Machine Intelligence, February 1992, pp. 239-256, Vol. 14, No. 2, describes a general purpose method for the accurate and computationally efficient registration of 3-D shapes including free-form curves and surfaces. However, these theoretical solutions alone do not provide pose estimation solutions, in particular at a rate and accuracy required for acquiring a target vehicle.

It would be advantageous to provide a relative navigation measurement system that overcomes these and other disadvantages.

SUMMARY

The present embodiments are directed to a relative navigation measurement system implemented in a combination of software and hardware, including for example, Very High Speed Integrated Circuit Hardware Description Language (VHDL) programmed in a semiconductor device. In some embodiments, the system is implemented for space flight missions requiring vehicle-relative and terrain-relative navigation and control. The present system may process real-time or recorded range and intensity images from 3D imaging sensors such as Light Radar or Light Detection and Ranging (LiDAR) systems, and compares them to known models of the target vehicle surfaces to output the position and orientation of the known target vehicle relative to the sensor coordinate frame.

In one exemplary embodiment, a navigation system includes an image acquisition device for acquiring a range image of a target vehicle, at least one processor, a memory including a target vehicle model and computer readable program code, where the processor and the computer readable program code are configured to cause the navigation system to convert the range image to a point cloud having three dimensions, compute a transform from the target vehicle model to the point cloud, and use the transform to estimate the target vehicle's attitude and position for capturing the target vehicle.

In another exemplary embodiment, a navigation system includes an image acquisition device for acquiring a range image of a target vehicle, and an integrated circuit programmed with computer readable program code in firmware to convert the range image to a point cloud having three dimensions, compute a transform from the target vehicle model to the point cloud, and use the transform to estimate the target vehicle's attitude and position for capturing the target vehicle.

In yet another exemplary embodiment, a navigation system includes an image acquisition device for acquiring a range image of a target vehicle, at least one processor, a memory including a target vehicle model and computer readable program code, and an iterative closest point function implemented by the processor and the computer readable program code and configured to convert the range image to a point cloud having three dimensions, compute a transform from the target vehicle model to the point cloud, and use the transform to estimate the target vehicle's attitude and position for capturing the target vehicle.

BRIEF DESCRIPTION OF THE DRAWINGS

The foregoing aspects and other features of the embodiments are explained in the following description, taken in connection with the accompanying drawings, wherein.

DETAILED DESCRIPTION

Figure 1:
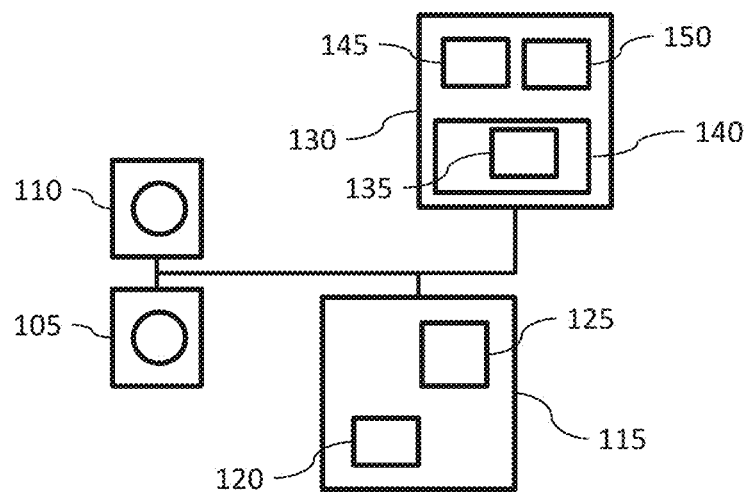
FIG. 1 shows a block diagram of a system in which aspects of the disclosed embodiments may be applied.

FIG. 1 illustrates one embodiment of a navigation system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

The disclosed embodiments are directed to providing a relative navigation (pose estimation) capability to enable autonomous rendezvous and capture of various targets, for example, space born targets including non-cooperative targets. In at least one embodiment implemented to address the technical challenges described above, sensors, processors, memory devices, and computing devices have been integrated in a flight-like configuration.

The navigation system 100 includes a first optical camera 105 and a second optional optical camera 110 having a different point of view. For example, the first and second optical cameras 105, 110 may have 11 and 57 degree points of view, respectively, optimized for a particular range to a target. In other embodiments, the first and second optical cameras 105, 110 may have any suitable points of view. In at least one embodiment, the optical cameras may have 1 megapixel detectors and may provide monochrome visible wavelength images. The system may also include a flash LiDAR system 115 with a laser 120 for illumination and a detector array 125 for measuring return intensity and range. The laser 120 may produce ultraviolet, visible, or near infrared light with a beam divergence selected to illuminate a desired scene. For example, a near infrared laser may be used having a 20 degree or any suitable beam divergence. The laser beam divergence and gain may be adjustable in order to obtain a desired field of view, return intensity and range. The detector array 125 may comprise, for example, a 256×256 PIN diode array or any detector array appropriate for use in a LiDAR system. The detector array 125 may also have an adjustable gain and field of view in order to optimize the return intensity and range detection. The LiDAR system 115 generally provides output data in the form of a range image, where each pixel includes a range and intensity value.

In at least one aspect of the disclosed embodiments, the navigation system 100 includes at least one computing apparatus 130 under the control of one or more programs in the form of computer readable program code 135 stored on at least one computer readable medium 140. The computer readable program code 135 stored on the at least one computer readable medium 140 may be implemented for carrying out and executing the operations of the navigation system 100 described herein. The computer readable medium 140 may be a memory of the computing apparatus 130. It should be understood that the computer readable medium 140 may store one or more models of target vehicles In alternate aspects, the computer readable program code may be stored in a memory external to, or remote from, the computing apparatus 130. The memory may include magnetic media, semiconductor media, optical media, or any media which is readable and executable by a computer. Computing apparatus 130 may also include a microprocessor 145 for executing the computer readable program code 135 stored on the at least one computer readable medium 140. In at least one aspect, computing apparatus 130 may include one or more input or output devices, generally referred to as a user interface 150 which may operate to allow input to the computing apparatus 130 or to provide output from the computing apparatus 130, respectively.

Figure 2:
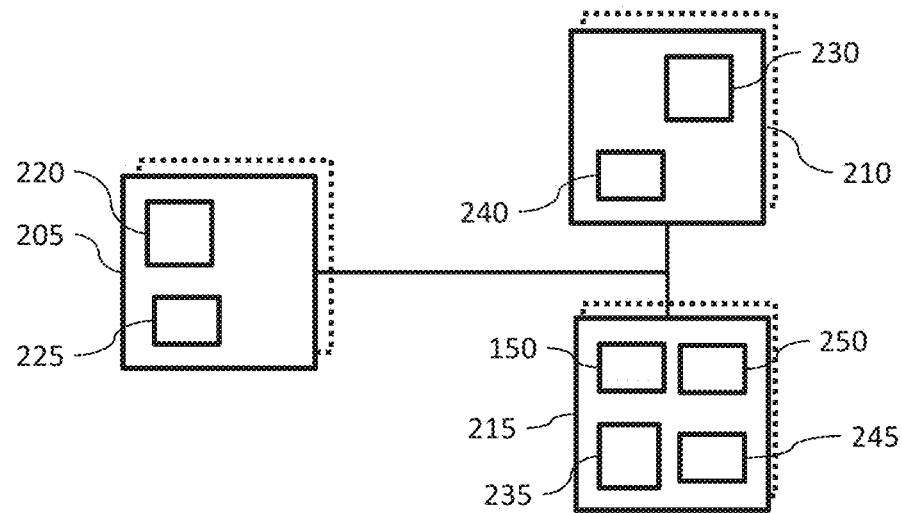
FIG. 2 illustrates an exemplary computing apparatus of FIG. 1 implemented as a hybrid computing platform.

Referring to FIG. 2, in at least one embodiment, the computing apparatus 130 may comprise a hybrid computing platform designed to provide command and data handling functions for earth-orbiting satellites. The hybrid computing platform may include, for example, one or more power modules 205, processor modules 210, and video control modules 215. The power modules 205, processor modules 210, and video control modules 215 may be embodied on printed circuit cards. The power modules 205, processor modules 210 and video control modules 215 may be implemented as Field Programmable Gate Arrays (FPGAs), Application Specific Integrated Circuits (ASICs), Complex Programmable Logic Devices (CPLDs), individually or in combination, or other integrated circuits programmed specifically to perform the functions of the navigation system 100.

The power modules 205 may include power supplies 220 and control circuitry 225 for providing power to the processor 210 and video modules 215. The power supplies 220 may include utilize linear, switching, or any suitable power supply technology. The processor 210 modules and video modules 215 may include memory 230, 235 for storing the computer readable program code 135 described above, and one or more processors 240, 245 for executing the computer readable program code 135. One exemplary embodiment of the hybrid computing platform may include two processor modules 210, each including two FPGAs where each FPGA further includes two processors running at any suitable speed, such as 250 MHz. These eight processors may host multiple instantiations of the pose estimation applications disclosed herein, along with command and telemetry handling applications that allow a flight-like terminal to control the navigation system remotely. The one or more video control modules 215 may operate to compress data from the optical cameras and LiDAR systems, provide the user interface 150 functions described above, and may also provide storage for raw sensor images for later playback.

In at least one embodiment, in addition to the optical cameras 105, 110, and the LiDAR system 115, the navigation system 100 may include a computing platform comprising integrated circuits programmed specifically to perform the navigation system functions, for example, the hybrid computing platform shown in FIG. 2. According to at least one aspect, the navigation system 100 may include a combination of software and integrated circuit firmware, for example, software in a computing system and FPGA firmware written in VHDL or may be implemented specifically in integrated circuit firmware. The navigation system 100 may be incorporated in an embedded system or within an application on a workstation. The embedded system may run under an operating system environment, for example, a Linux operating system, and the workstation may be a Linux workstation.

The navigation system 100 may generally operate to process real-time flash frames or range images of a target vehicle from the LiDAR system 115 to produce a six degree of freedom pose estimate. The system processes the range images as a point cloud, samples the point cloud using tunable quality metrics, and uses a custom implementation of an Iterative Closest Point (ICP) determination to determine an optimal estimate of the relative position and attitude of the target vehicle. The system also provides an independent three degree of freedom relative position measurement that is particularly useful when a number of valid returns in the point cloud shrinks as the target vehicle moves farther away.

Figure 3:
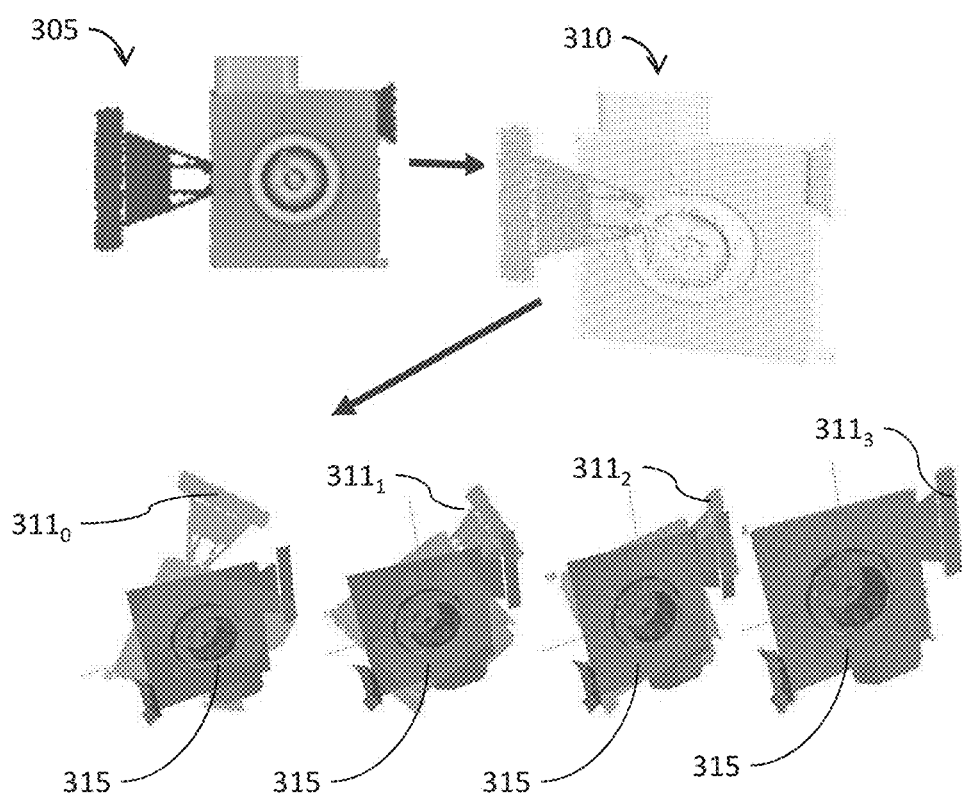
FIG. 3 displays a summary of the operations of the disclosed embodiments.

FIG. 3 shows a graphical depiction of an overview of the operation of the navigation system 100. A range image 305 of the target vehicle is obtained from the LiDAR system 115 with pixels in rows and columns, where each pixel also includes an indication of a distance, or range. In one or more embodiments, the indication of range may include shading or a color. The range image 305 is converted, using the point of view information, to a three dimensional point cloud 310 where each pixel has an x, y, and z coordinate value. A pre-existing model 315 of the target vehicle is centered at the origin of the point cloud coordinate frame and a translation and rotation is applied to the three dimensional point cloud $311_0$-$311_3$ to align with the pre-existing model 315. The resulting translation and rotation is then used to precisely determine the target vehicle's relative attitude and position or pose. The operations are iterated both to provide an accurate pose at a particular time and to provide a number of poses as the target vehicle moves.

Figure 4A:
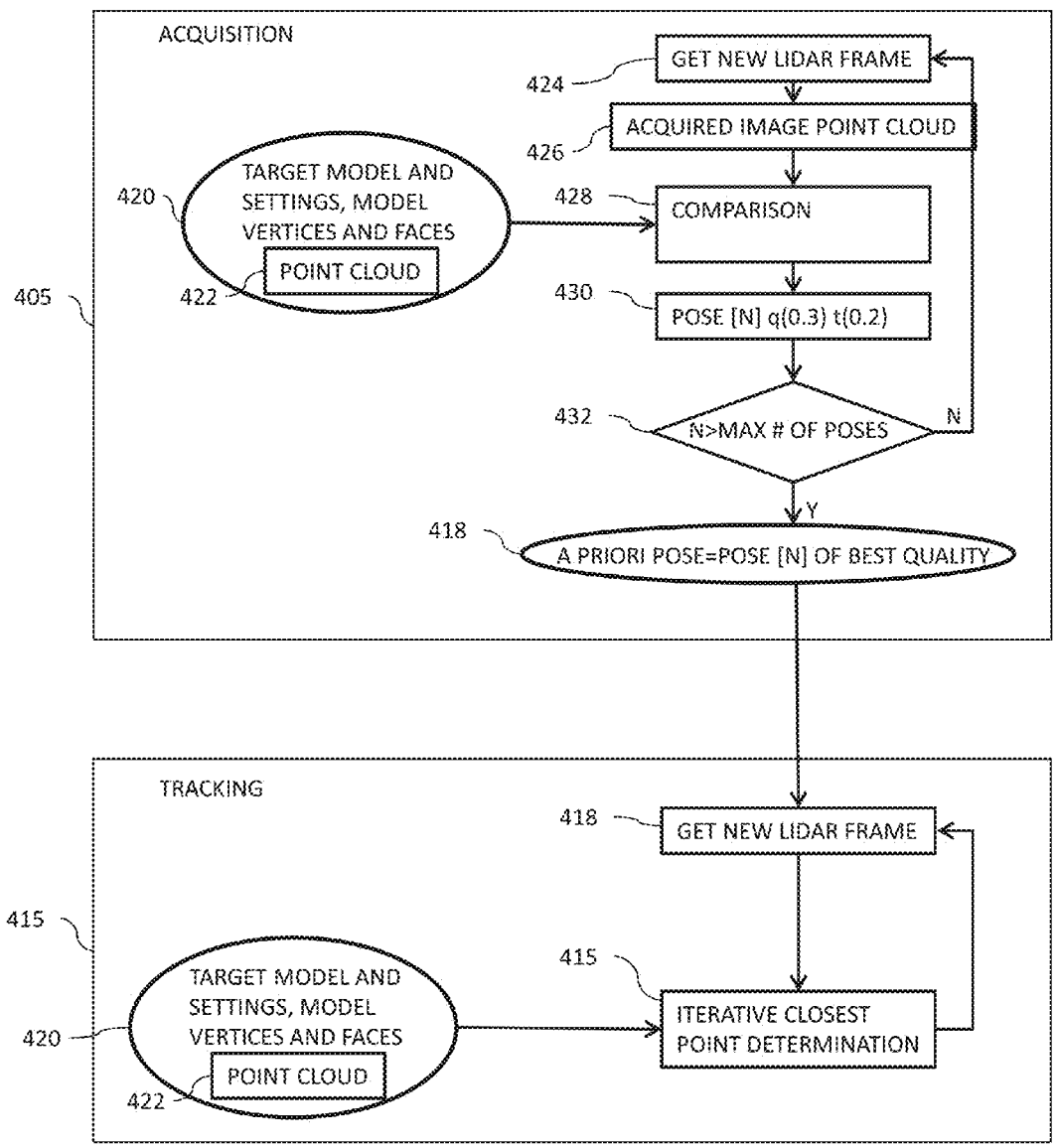
FIGS. 4A and 4B show a detailed block diagram of the functions performed by the disclosed embodiments.
Figure 4B:
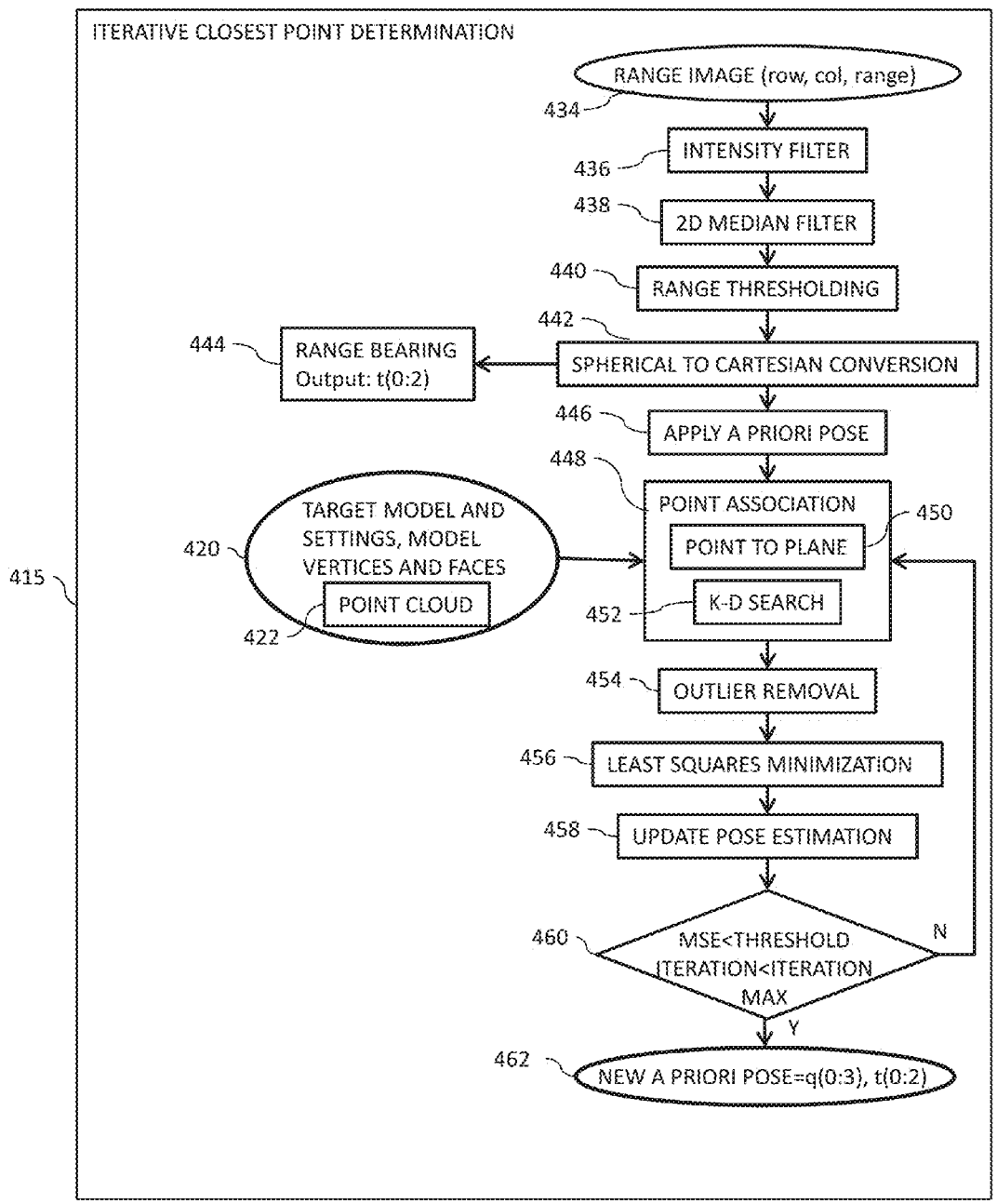

FIGS. 4A and 4B depict a detailed diagram of the functions of the navigation system 100. The system functions may be divided among acquisition 405, tracking 410, and Iterative Closest Point (ICP) determination 415, the result of which yields the target vehicle poses.

Referring to FIG. 4A, the tracking function 410 is supplied with an a priori pose estimate 418 in order to provide the function with a general idea of how the target vehicle is positioned and oriented upon initialization. In at least one embodiment, the initial priori pose estimate may be generated automatically by the acquisition function 405 starting with a stored model 420 of the target vehicle that includes a stored model point cloud 422. A range image 424 of the target vehicle is acquired from LiDAR system 115 and is converted to an acquired image point cloud 426. The stored model point cloud 422 and the acquired image point cloud 426 are compared 428 to generate a score 430 reflecting a fit between the stored model point cloud 420 and the acquired image point cloud 424.

Figure 5:
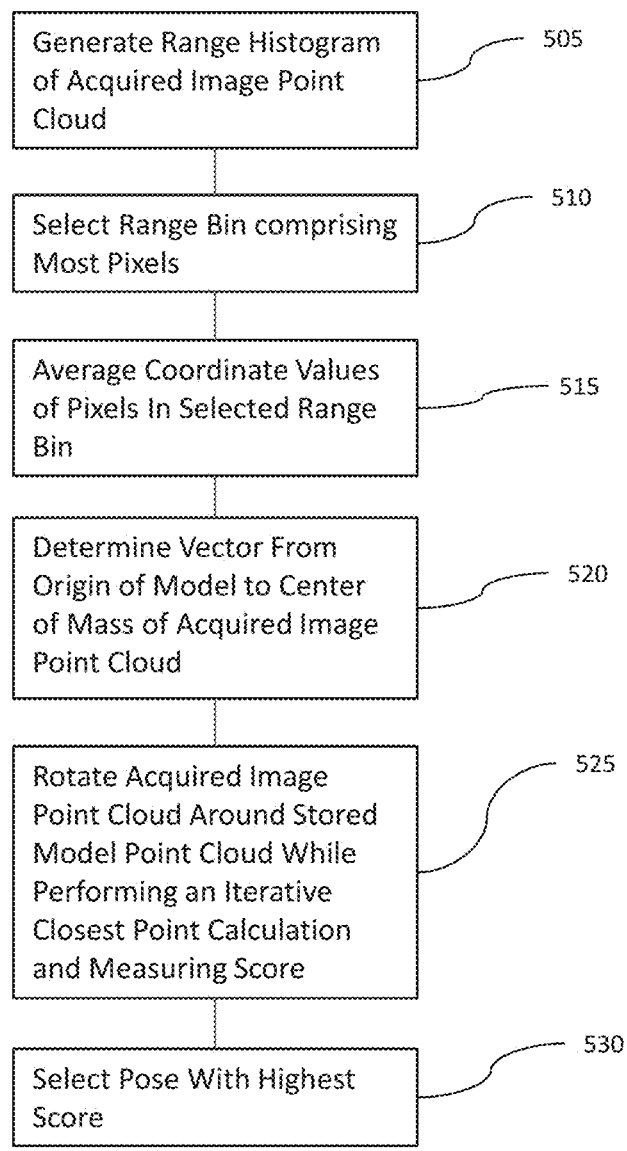
FIG. 5 shows a block diagram of a point cloud comparison procedure according to the disclosed embodiments.

FIG. 5 shows a block diagram of the comparison procedure 428. The comparison includes generating a range bearing estimate by creating a range histogram (of configurable resolution) the acquired image point cloud 424 as shown in block 505 and selecting a range bin of the histogram comprising the most pixels, as shown in block 510. An average of the coordinate values of the pixels in the selected range bin is determined as shown in block 515. The average of the coordinate values is used to determine a vector from an origin of the stored model 420 to a center of mass of the acquired image point cloud 426 determined by the average of the coordinate values of the pixels of the acquired image point cloud 426, as shown in block 520. The vector represents a range bearing position estimate of the target vehicle in three degrees of freedom. In block 525, the range bearing position estimate is applied as the translation estimate for the a priori pose, and the acquired image point cloud 426 is rotated 360 degrees around the Z axis of the stored model point cloud 422 while performing an Iterative Closest Point determination and measuring the score reflecting a fit between the stored model point cloud 422 and the acquired image point cloud 426. As shown in block 530, the pose with the best score is selected.

Returning to FIG. 4A, additional range images are acquired and acquired image point clouds are compared to the stored model point cloud 422 until a predetermined number of comparisons are made 432 and the acquired image point cloud with the highest score is used as the a priori pose estimate 418.

The tracking function 410 initially begins with a range image of the a priori pose estimate 418 as a new LiDAR frame and the stored model 420 to perform the Iterative Closest Point function 415.

The Iterative Closest Point function 415 begins with a range image 434 of the target vehicle from the LiDAR system 115 with pixels in rows and columns with indications to represent a distance, or range. Intensity filtering 436 is performed to filter out pixels that are not in the optimal dynamic range of the detector. The quality of LiDAR range measurements is influenced by the intensity of the return sensed by the LiDAR receiver. As an attempt to increase point cloud quality, intensity filtering 436 may filter out pixels below a configurable minimum intensity threshold and above a maximum intensity threshold defined relative to a maximum intensity value in a frame. A 2D median filter 438 may optionally be used to remove salt and pepper noise from a LiDAR image.

Range thresholding 440 may be applied to the image to filter out any returns outside of a configurable subset of desired ranges, for example, unwanted features such as structures or portions of the image that are unrelated to the target vehicle. The applied thresholds may be variable from frame to frame because the unrelated portions may move as the target vehicle moves. In one or more embodiments, a distance range around a distance estimate for each pixel may be defined, for example, a z coordinate range around the z coordinate estimate for each pixel, and those pixels that do not fall within the distance range may be filtered. Windowing techniques may also be employed as part of the range thresholding, where a pixel window may be defined so that only pixels of interest are used to determine a filtered range image.

The filtered range image is then converted 442 to a three dimensional point cloud of the image, using, for example, a spherical to Cartesian conversion, where each pixel has an x, y, and z coordinate. The conversion also provides a range and bearing output 444.

The a priori pose 446 is then applied to the three dimensional point cloud of the image. In order to correct for any differences between the a priori pose 446 and the three dimensional point cloud of the image, point association 448 is performed including a comparison of each point of the image point cloud to each surface on the target vehicle model 420, referred to as point to plane 450, to find the closest points of the target vehicle model and the three dimensional point cloud of the image. A k-dimensional tree search 452 may be implemented as part of the point association, where surfaces on the model may be used only if pertinent to the closest point determination, or discarded to avoid calculating a distance to every surface on the model for every point in the image point cloud.

Outlier removal 454 may then be performed to remove points residing outside the target vehicle model after the a priori pose estimate is applied to the point cloud of the image. A three dimensional boundary or bubble may be defined around the stored model point cloud 422. Points in the LiDAR derived 3D point cloud of the image residing outside of the predefined bubble after an a priori pose estimate is applied to the point cloud of the image may be disregarded when determining the next pose estimate. This may provide a better pose estimate by not allowing poor quality measurements to skew results. Generally speaking, the dimensions of the bubble may be expanded as part of the acquisition function 405 to allow more points to be considered in order to find a pose that globally minimizes mean square error between the model surfaces and the acquired image point cloud locations. In one or more embodiments, the bubble dimensions may be decreased when performing the tracking function to increase accuracy by removing outliers. Thus, the number of pixels to be processed may be tuned to improve an overall frame rate depending on the function being performed.

A least squares minimization 456 may be performed, for example, using the Horn algorithm, to minimize any offset between the closest points between the target vehicle model and image point cloud. The resulting estimated transform is used to update the pose estimation 458.

A decision may be made 460 to perform the point association 448, outlier removal 454, least squares minimization 456, and pose estimation update 458 procedures repetitively per image depending on, for example, largely governed by how many iterrations are permitted, for example, due to time constraints, and how far the mean square error (MSE) has been reduced. In at least one example, if the quality of the fit, shown by a low MSE, meets an acceptable threshold, then the Iterative Closest Point (ICP) determination 415 yields a new a priori pose 462.

Figure 6:
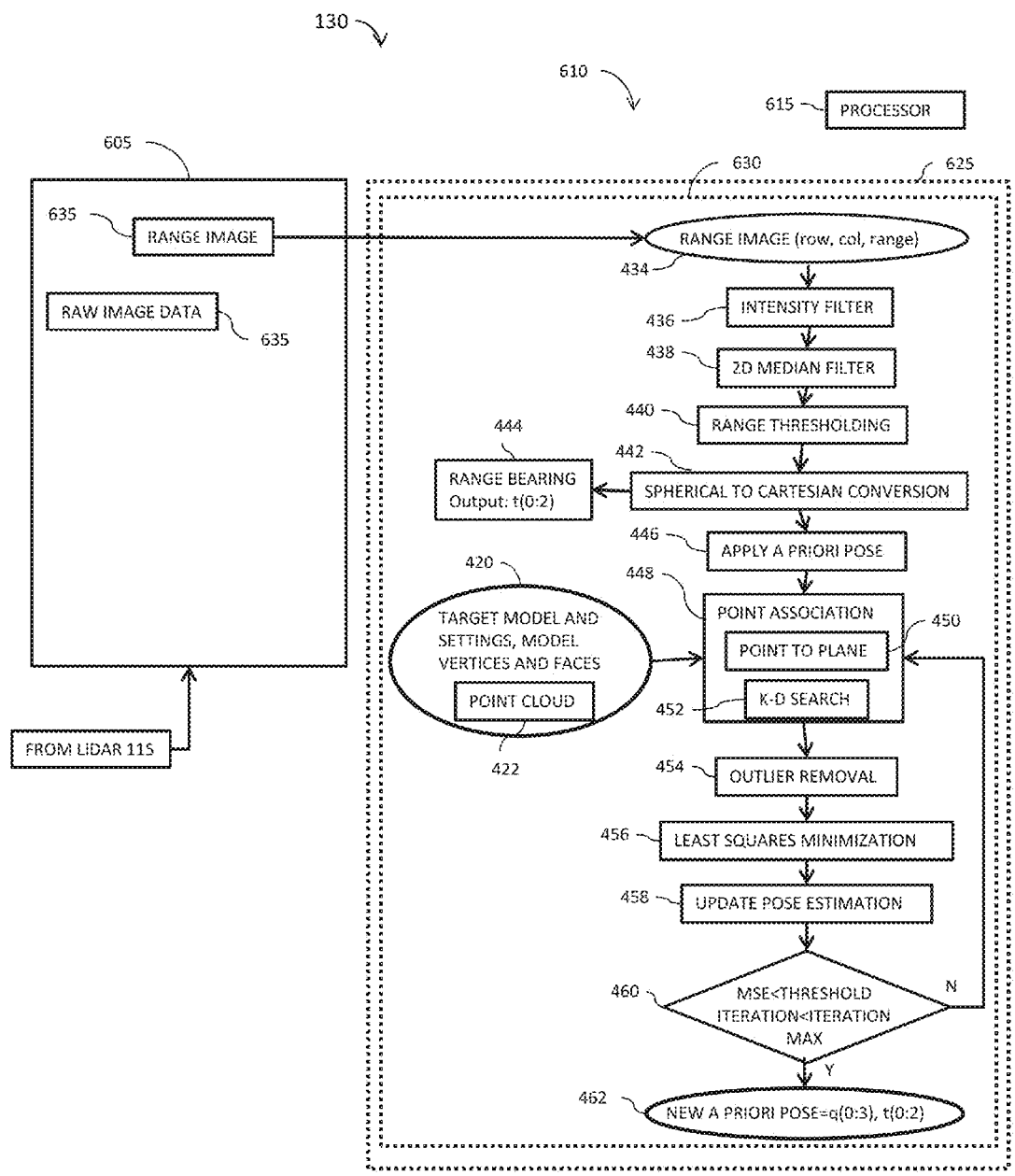
FIGS. 6-8 illustrate different embodiments as incorporated into a system comprising a combination of hardware and software.

FIG. 6 shows another embodiment of the computing device 130 comprising a combination of a specifically programmed integrated circuit 605 and a computer 610. In this embodiment, output data from LiDAR system 115 is provided to integrated circuit 605. Integrated circuit 605 may be implemented as a field programmable gate array (FPGA), application specific integrated circuit (ASIC), complex programmable logic device (CPLD) or other integrated circuit programmed specifically to perform the functions of the navigation system 100. Computer 610 may be implemented as an embedded system, referred to as a computer on a chip, with one or more processors, memory devices, and computer readable program code comprising an operating system and application programs. In at least one embodiment, computer 610 may be implemented as an embedded system within an FPGA.

In this embodiment, integrated circuit 605 may process output data from the LiDAR system 115, store raw image data 635 from the LiDAR system 115, and produce range image data 615 for the computer 610. The computer 610 may include a processor 615 operating under the control of one or more programs in the form of computer readable program code stored on at least one computer readable medium 625. The one or more programs may include one or more instantiations of the pose estimation applications 630 for determining range and bearing to one or more features of a target vehicle to be acquired.

Figure 7:
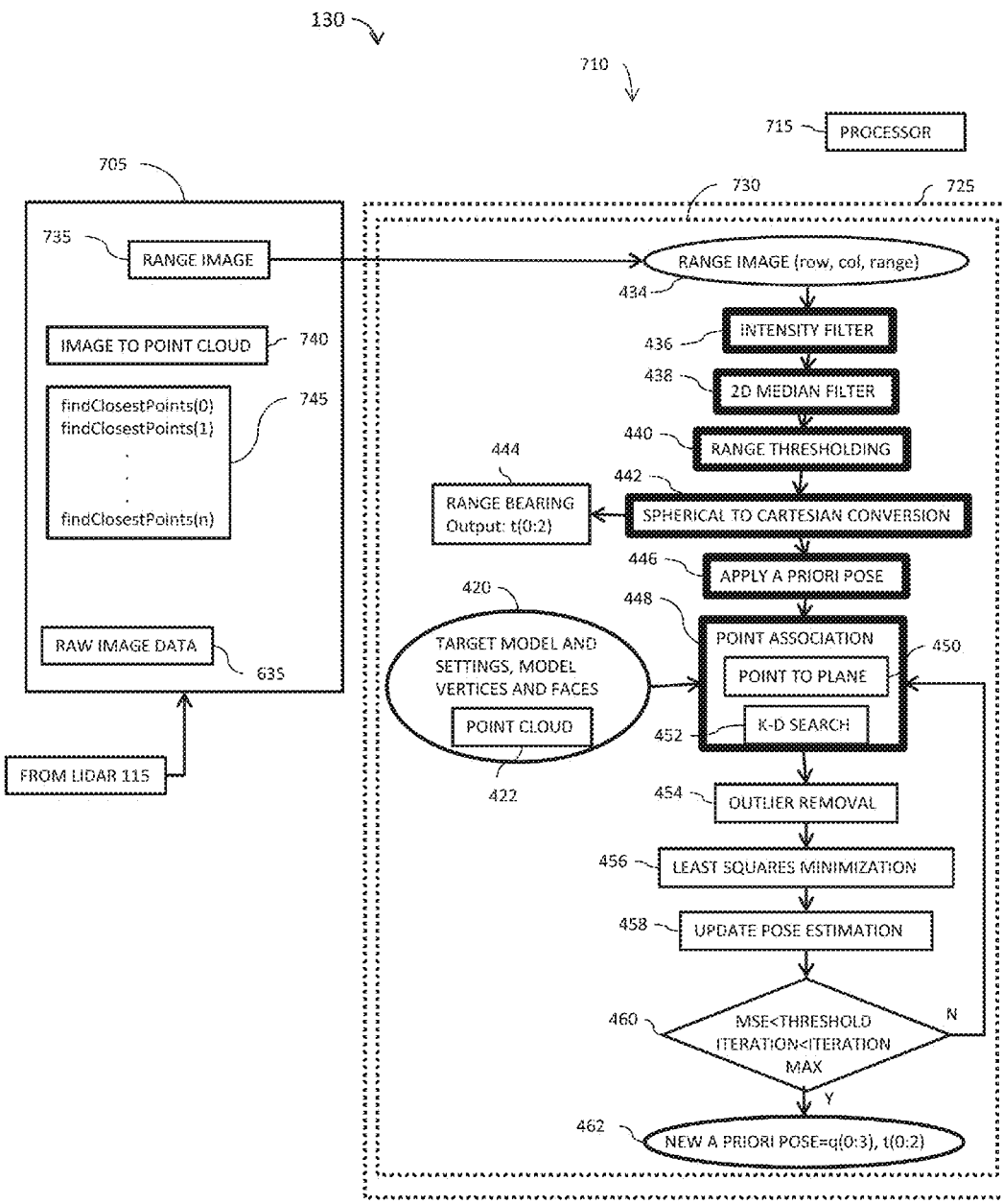

FIG. 7 shows yet another embodiment of the computing device 130 comprising another combination of a specifically programmed integrated circuit 705 and a computer 710. The computer 710 may include a processor 715 operating under the control of one or more programs in the form of computer readable program code stored on at least one computer readable medium 725. The one or more programs may include one or more portions of the pose estimation applications 730 for determining range and bearing to one or more features of a target vehicle to be acquired.

In at least one aspect, the integrated circuit 705 is specifically programmed to perform at least a portion of the pose estimation applications 730 shown highlighted, for example, intensity filtering 436, 2D median filtering 438, range thresholding 440, spherical to Cartesian conversion 442, application of the a priori pose 446, and point association 448, as described above. The intensity filtering 436, 2D median filtering 438, range thresholding 440, and spherical to Cartesian conversion 442 are implemented as an image to point cloud function 740 in the integrated circuit 705, while the application of the a priori pose 446, and point association 448 are implemented as findClosestPoints(0-N) 720 in the integrated circuit 705. The integrated circuit 705 is also configured to process output data from the LiDAR system 115, store raw image data 735 from the LiDAR system 115, and produce range image data 715 for the computer 710.

Figure 8:
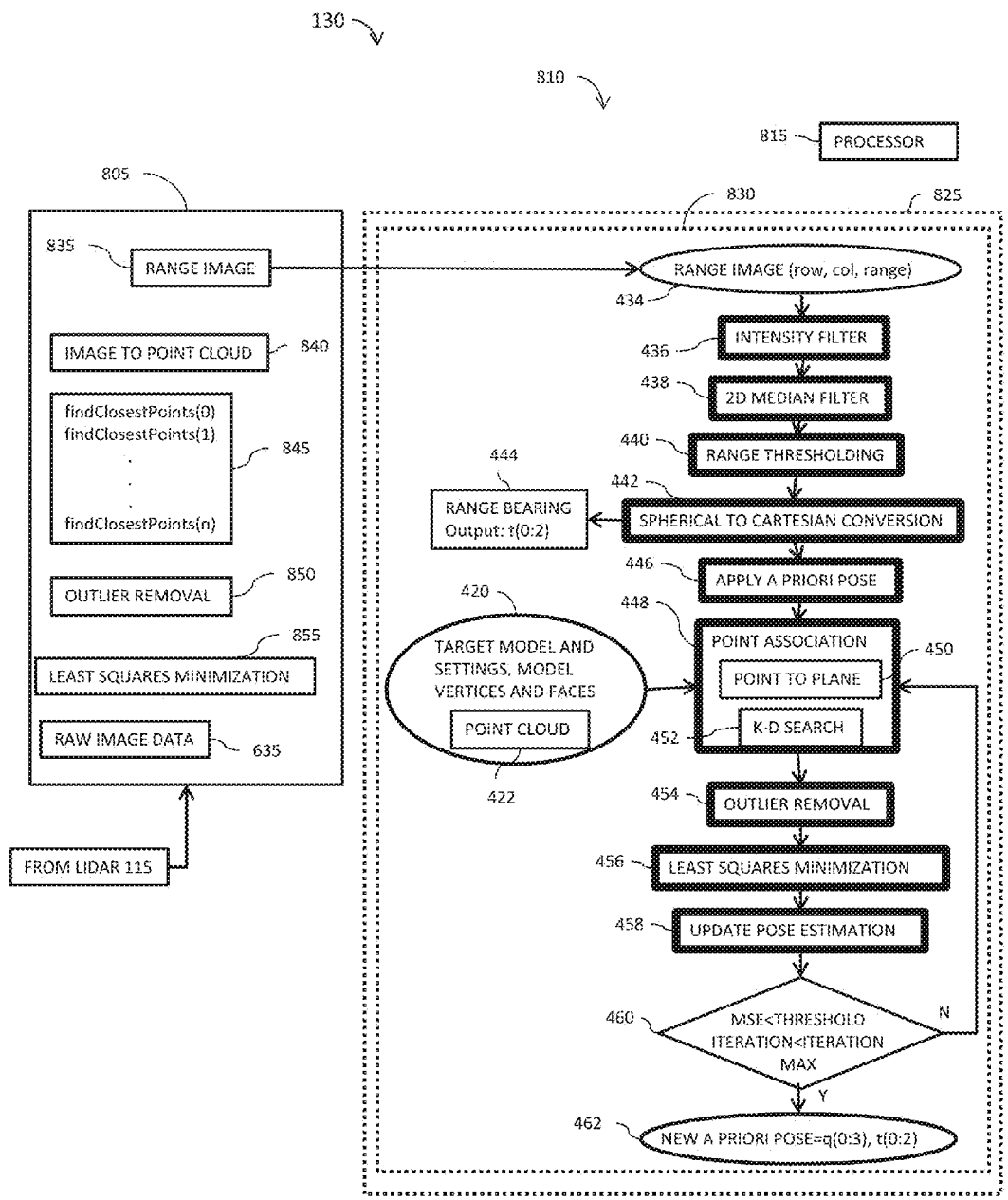

FIG. 8 shows still another embodiment of the computing device 130 comprising another combination of a specifically programmed integrated circuit 805 and a computer 810. The computer 810 may include a processor 815 operating under the control of one or more programs in the form of computer readable program code stored on at least one computer readable medium 825. In at least one aspect, the integrated circuit 805 is specifically programmed to perform substantially all of the computationally intensive tasks of the pose estimation applications 830 shown highlighted, for example, intensity filtering 436, 2D median filtering 438, range thresholding 440, spherical to Cartesian conversion 442, application of the a priori pose 446, point association 448, outlier removal 454, least squares minimization 456, and pose estimation update 458, as described above.

Similar to the embodiment shown in FIG. 7, the intensity filtering 436, 2D median filtering 438, range thresholding 440, and spherical to Cartesian conversion 442 are implemented as an image to point cloud function 840 in the integrated circuit 705, while the application of the a priori pose 446, and point association 448 are implemented as findClosestPoints(0-N) 845 in the integrated circuit 805. In addition, the integrated circuit 805 includes the outlier removal 454, least squares minimization 456, and pose estimation update 458 functions implemented within the integrated circuit outlier removal 850 and least squares minimization 855 functions. The integrated circuit 805 is also configured to process output data from the LiDAR system 115, store raw image data 635 from the LiDAR system 115, and produce range image data 835 for the computer 810.

The navigation system disclosed herein has been successfully demonstrated in space flight like hardware in full physical simulations of spacecraft rendezvous, as described in Galante et al., "Pose Measurement Performance of the Argon Relative Navigation Sensor Suite in Simulated Flight Conditions," AIAA Guidance, Navigation, and Control Conference, 13-16 Aug. 2012, pp. 1-25, Minneapolis, Minn., incorporated by reference in its entirety.

The system uniquely fuses space flight hardware and software to provide a real time pose estimate for non-cooperative targets. The system may be adapted to any physical object ranging from terrain such as the moon or asteroids to space junk targeted for removal. It can be used for cooperative docking using retro-reflectors as well as non-cooperative rendezvous to spacecraft not designed to do so.

In summary, the disclosed navigation system takes in a range image from a 3 dimensional imager, filters and thresholds the image, and converts it to a point cloud in the Cartesian coordinate system. The system then operates to minimize the distances between the point cloud and a model of the target at the origin of the Cartesian frame by manipulating point cloud rotation and translation. This procedure is repeated a number of times for a single image until a predefined mean square error metric is met and then the process repeats for a new image. The rotation and translation operations performed on the point cloud represent an estimate of relative attitude and position, also referred to as pose. In addition to 6 degree of freedom (DOF) pose estimation, the navigation system also provides a range and bearing estimate relative to the sensor reference frame. This estimate is based upon a calculation that generates a configurable histogram of range information, and analyzes characteristics of the histogram to produce the range and bearing estimate. This is useful because it can generated quickly and provides valuable information for seeding the iterative closest point determination.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

The invention claimed is:

1. A navigation system comprising:
   an image acquisition device for acquiring a range image of a target vehicle at least one processor; and
   a memory including a target vehicle model and computer readable program code,
   the processor and the computer readable program code configured to cause the navigation system to:
   convert the range image to a point cloud having three dimensions;
   compute a transform from the target vehicle model to the point cloud;
   use the transform to estimate the target vehicle's attitude and position for capturing the target vehicle;
   wherein the processor and the computer readable program code are configured to generate an a priori pose estimate of the target vehicle by:
      comparing a target vehicle point cloud with the range image point cloud; and
      generating a score reflecting a fit between the target vehicle point cloud and the range image point cloud; and
   wherein the processor and the computer readable program code are configured to compare the target vehicle point cloud with the range image point cloud by:
      creating a range histogram of the range image point cloud and determining an average of coordinate values of pixels in a selected range bin of the histogram;
      determining a vector from an origin of the target vehicle point cloud to a center of mass of the range image point cloud;
      rotating the range image point cloud around the target vehicle point cloud and determining the score reflecting a fit between the target vehicle model and the point cloud; and
   using the rotated range image point cloud having the highest score as the a priori pose estimate of the target vehicle.

2. The navigation system of claim 1, wherein the processor and the computer readable program code are configured to compute the transform from the target vehicle model to the point cloud by:
   centering the target vehicle model at an origin of the point cloud; and
   applying a translation and rotation to the point cloud to align with the target vehicle model.

3. The navigation system of claim 1, wherein the processor and the computer readable program code are configured to correct errors identified while generating said priori pose estimate said errors are corrected by:
   identifying closest points of the target vehicle model and the range image point cloud;
   removing points from the range image point cloud residing outside the target vehicle model;
   performing a least squares minimization to minimize any offset between the remaining closest points of the target vehicle model and the range image point cloud; and
   utilizing the resulting transform to update the a priori pose.

4. The navigation system of claim 3, wherein the processor and the computer readable program code are configured to identify the closest points of the target vehicle model and the range image point cloud using a k-dimensional tree search.

5. The navigation system of claim 3, wherein the processor and the computer readable program code are configured to remove points from the range image point cloud residing outside the target vehicle model by:
   defining a three dimensional boundary around the target vehicle point cloud; and
   disregarding points in the range image point cloud residing outside the three dimensional boundary.

6. The navigation system of claim 3, wherein the processor and the computer readable program code are configured to use the updated a priori pose to estimate the target vehicle's attitude and position for capturing the target vehicle.

7. A navigation system comprising:
   an image acquisition device for acquiring a range image of a target vehicle; and
   an integrated circuit programmed with computer readable program code in firmware to:
   convert the range image to a point cloud having three dimensions;
   compute a transform from a stored target vehicle model to the point cloud;
   use the transform to estimate the target vehicle's attitude and position for capturing the target vehicle;
   wherein the integrated circuit is programmed with computer readable program code in firmware to generate an a priori pose estimate of the target vehicle by:
   comparing a target vehicle point cloud with the range image point cloud; and
   generating a score reflecting a fit between the target vehicle point cloud and the range image point cloud; and
   wherein the integrated circuit is programmed with computer readable program code in firmware to compare the target vehicle point cloud with the range image point cloud by:
creating a range histogram of the range image point cloud and determining an average of coordinate values of pixels in a selected range bin of the histogram;
   determining a vector from an origin of the target vehicle point cloud to a center of mass of the range image point cloud;

rotating the range image point cloud around the target vehicle point cloud and determining the score reflecting a fit between the target vehicle model and the point cloud; and using the rotated range image point cloud having the highest score as the a priori pose estimate of the target vehicle.

8. The navigation system of claim 7, wherein the integrated circuit is programmed with computer readable program code in firmware to compute Rail the transform from the target vehicle model to the point cloud by:

centering the target vehicle model at an origin of the point cloud; and applying a translation and rotation to the point cloud to align with the target vehicle model.

9. The navigation system of claim 7, wherein the integrated circuit, is programmed with computer readable program code in firmware to correct errors identified while said integrated circuit generates said priori pose estimate, resulting from applying the a priori pose estimate to the range image point cloud said errors are corrected by:

identifying closest points of the target vehicle model and the range image point cloud;

removing points from the range image point cloud residing outside the target vehicle model;

performing a least squares minimization to minimize any offset between the remaining closest points of the target vehicle model and the range image point cloud; and utilizing the resulting transform to update the a priori pose.

10. The navigation system of claim 9, wherein the integrated circuit is programmed with computer readable program code in firmware to identify the closest points of the target vehicle model and the range image point cloud using a k-dimensional tree search.

11. The navigation system of claim 9, wherein the integrated circuit is programmed with computer readable program code in firmware to remove points from the range image point cloud residing outside the target vehicle model by:

defining a three dimensional boundary around the target vehicle point cloud; and disregarding points in the range image point cloud residing outside the three dimensional boundary.

12. The navigation system of claim 9, wherein the integrated circuit is programmed with computer readable program code in firmware to use the updated a priori pose to estimate the target vehicle's attitude and position for capturing the target vehicle.

13. A navigation system comprising:

an image acquisition device for acquiring a range image of a target vehicle;

at least one processor;

a memory including a target vehicle model and computer readable program code; and an iterative closest point function implemented by the processor and the computer readable program code and configured to:

convert the range image to a point cloud having three dimensions;

compute a transform from the target vehicle model to the point cloud;

use the transform to estimate the target vehicle's attitude and position for capturing the target vehicle;

said navigation system further comprising an acquisition function implemented by the processor and the computer readable program code and configured to generate an a priori pose estimate of the target vehicle by:

comparing a target vehicle point cloud with the range image point cloud; and generating a score reflecting a fit between the target vehicle point cloud and the range image point cloud;

wherein the acquisition function is further configured to compare the target vehicle point cloud with the range image point cloud by:

creating a range histogram of the range image point cloud and determining an average of coordinate values of pixels in a selected range bin of the histogram;

determining a vector from an origin of the target vehicle point cloud to a center of mass of the range image point cloud;

rotating the range image point cloud around the target vehicle point cloud and determining the score reflecting a fit between the target vehicle model and the point cloud; and using the rotated range image point cloud having the highest score as the a priori pose estimate of the target vehicle.

14. The navigation system of claim 13, wherein the iterative closest point function is further configured to compute the transform from the target vehicle model to the point cloud by:

centering the target vehicle model at an origin of the point cloud; and applying a translation and rotation to the point cloud to align with the target vehicle model.

* * * * *